Sept. 30, 1969   P. SCHMIELAU   3,469,803
ENGINE CONSTRUCTION FOR VTOL AIRCRAFT
Filed Aug. 15, 1966   2 Sheets-Sheet 1
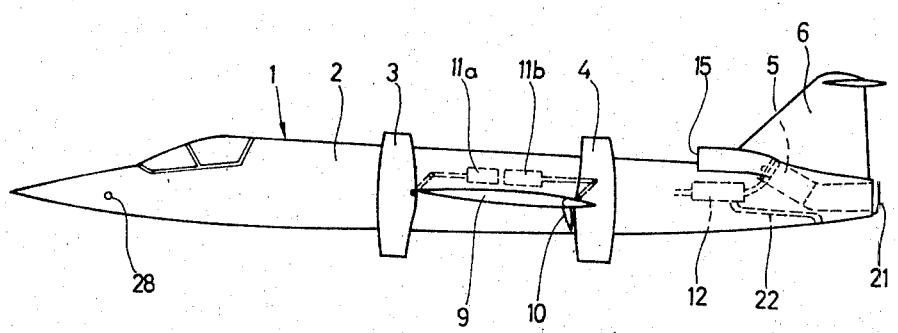
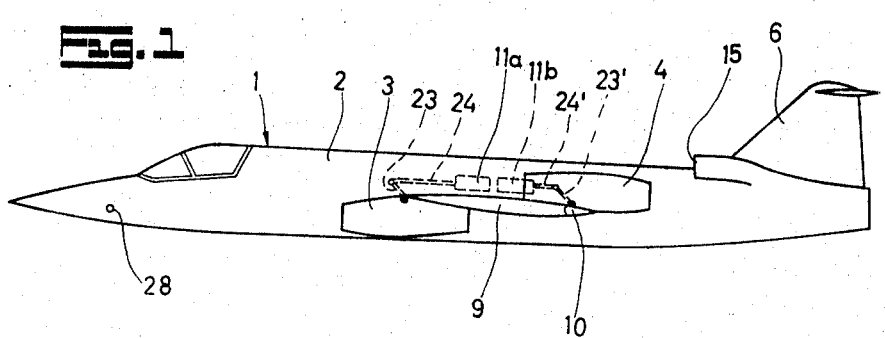
INVENTOR
Peter Schmielau
By *McGlew and Toren*
ATTORNEYS Sept. 30, 1969  P. SCHMIELAU  3,469,803
ENGINE CONSTRUCTION FOR VTOL AIRCRAFT
Filed Aug. 15, 1966  2 Sheets-Sheet 2
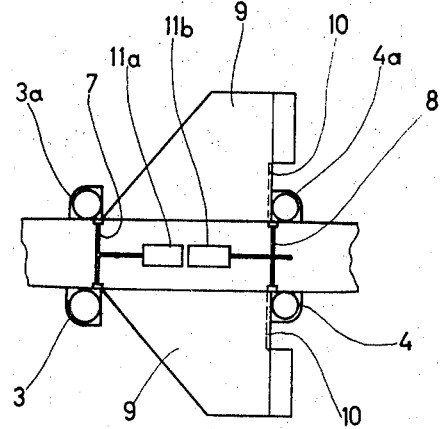
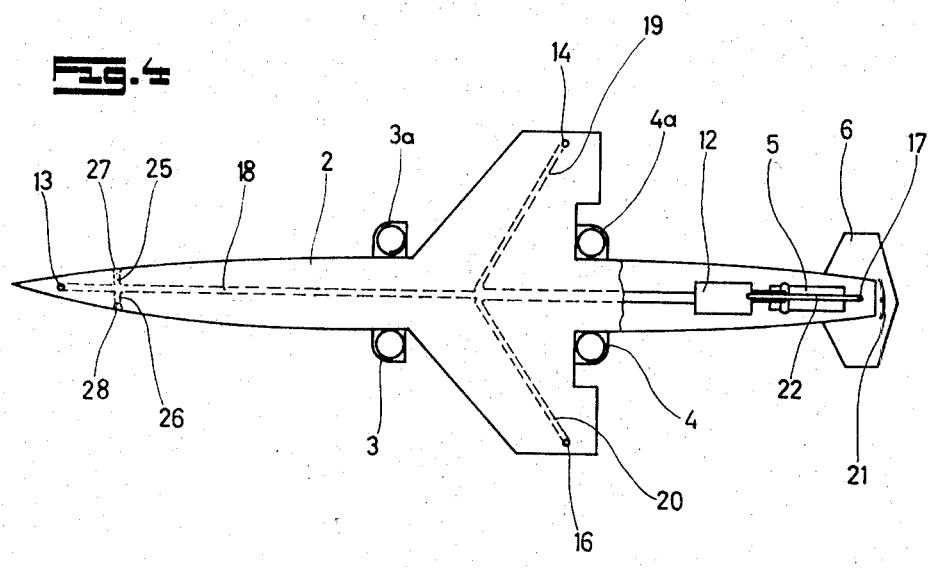
INVENTOR
Peter Schmielau
By McGlew and Toren
ATTORNEYS

3,469,803
ENGINE CONSTRUCTION FOR VTOL AIRCRAFT
Peter Schmielau, Deisenhofen, Germany, assignor to
Bolkow Gesellschaft mit beschrankter Haftung,
Munich, Germany
Filed Aug. 15, 1966, Ser. No. 572,275
Claims priority, application Germany, Aug. 21, 1965,
B 83,378
Int. Cl. B64c *29/04;* B64d *27/14*
U.S. Cl. 244—12                                7 Claims

ABSTRACT OF THE DISCLOSURE

A VTOL airplane comprises a fuselage having a wing structure extending outwardly from each side and which carries a thrust engine for horizontal propulsion adjacent the tail thereof. A pair of forward thrust engines are mounted directly adjacent the fuselage on respective opposite sides adjacent the forward end of the wing structure and a pair of trailing thrust engines are mounted adjacent the fuselage on respective opposite sides thereof adjacent the trailing end of the wing structure, the forward and rear trailing engines of respective sides being located along substantially the axis line of the wing structure and may be tilted from a vertical position to a horizontal position at which the engines become located beneath the wing and the trailing engines become located above the wing. Compressed air generated by the main engine is discharged as a thrust control gas at selected locations to provide an auxiliary means for controlling the attitude of the aircraft.

---

This invention relates, in general, to the construction of aircraft and, in particular, to a new and useful vertical take-off and landing aircraft having at least five jet engines of which four are arranged pivotally at both sides of the fuselage so that they may pivot about the edges of the wing of the aircraft and in which the front engines are pivotal so that they may be oriented in horizontal flight under the wing with the rear engines being pivotal to be oriented in horizontal flight above the wing.

VTOL airplanes with pivotal engines have the advantage that the same engines can be used both to obtain vertical take-off or landing and forward propulsion in cruising flight. A number of airplanes are known which have VTOL properties and which employ pivotal thrust engines. For example, such aircraft are known which include engines which are pivotally mounted at the tips of the wings of such aircraft. A disadvantage in this type of construction is that the hovering safety of the airplane is not insured in case of failure of one engine due to the great momental lever arm from the engine to the longitudinal inertia axis. Another disadvantage is that the supply and control lines for the engines must be very long and it is difficult to provide a satisfactory support for the pivot mechanism in the narrow wing air foils and damages to such devices may be caused by wing vibrations.

In another type of aircraft construction, one engine is mounted underneath each wing at both sides of the center of gravity directly on the fuselage of the airplane. Thus, the disadvantages of the great moment lever arm as well as the long supply and control lines are avoided, but such an arrangement is highly unfavorable since during the start and in the hovering phase there is only a narrow spacing between the engine inlets and the wings, so that the output of the engine is considerably reduced. In addition, the hovering safety of the airplane in the case of failure of an engine is not provided in this construction either. Some of the above disadvantages are avoided in a type of aircraft having pairs of engines on a supporting frame located at a distance from the fuselage and pivoting about axes extending transverse to the longitudinal axis of the airplane. There is an increase in hovering safety, but such a construction has the disadvantage that both the supporting frames and the engines which are arranged at a distance from the fuselage offer an increased air resistance in cruising flight and the accommodation of the pivot mechanism and the supply and control lines in the arms of the supporting frame present considerable difficulties.

In accordance with the present invention, the above disadvantages are overcome by providing a VTOL airplane in which a pivotal engine is mounted adjacent the fuselage on the leading and the trailing edge of each wing. The engines are arranged directly on the fuselage and are secured together in forward and rear pairs on respective forward and rear eccentically mounted shafts which traverse the fuselage. By arranging the forward two engines on each side of the fuselage on a common shaft which traverses the fuselage, uniform pivoting of each pair of the engines is achieved without an additional synchronizing device. Another advantage is that the weight moments of the pairs of engines arranged eccentrically on the respective shafts are effective in opposite directions from the front to the rear shaft so that if suitable means are provided, the necessary work required to be performed by the pivoting mechanism is reduced.

In accordance with another feature of the invention, the shafts carrying the engines are arranged relative to the fuselage so that the directions of the forces produced by the engines are symmetrical to the rolling axis of the airplane and they are also symmetrical to the pitching axis of the airplane within a range of the center of gravity.

The engines arranged in the immediate vicinity of the center of gravity of the airplane have small moments so that any control moments which may act on the airplane either in hovering or cruising flight such as, in the case of the failure of an engine, can be compensated by means of the rudders or the other engines. Because the engines of the present invention are arranged directly on the fuseage, there is very little increase in the frictional drag in cruising flight because practically half of the engine surfaces is covered by the fuselage and the wings. Another advantage is that the engine may be locked in a cruising position by well known means which are arranged on the fuselage of the airplane. In the preferred arrangement of the aircraft, the wing end tanks are provided at the free wing tips so that there is an additional reduction of air drag or resistance. The tanks arranged at the tips are formed as terminal disks and they relieve the wing statically.

In accordance with another feature of the invention, two engines each are arranged eccentrically on a pivot provided by a mounting shaft member, and each of these engine pairs is moved by a single pivot mechanism which can be mechanically favorabled designed because of the adequate space conditions in the fuselage. The mechanical driving force for the engine pairs need not be identical or in the same direction but can be differential so that it is possible to compensate for slight thrust differences between the individual pairs of engines by differential pivoting of the engines. This results in savings in weight by reduced expenditures for the pivot mechanism, and it makes it easier to introduce supply and control lines since only one connection has to be provided between a rotary and non-rotary part for each pair of engines. The advantages increase in accordance with another feature of the invention when both shafts, which serve as pivots, are pivoted by a single common pivot mechanism. The common pivot mechanism is advantageously designed so that it permits differential pivoting of the two shafts.

A further feature of the invention is that the engines are mounted so that the forward pairs may be arranged in cruising flight below the wing and the trailing pairs may be arranged above the wing. Such an arrangement has the advantage that the interference resistance of the airplane is reduced by the inlet and outlet flow of the engine jets.

In accordance with another feature of the invention, the trailing engines are advantageously arranged in pairs in the vicinity of the landing flap fulcrums. This makes it possible to arrange both the lift and the thrust center in the immediate vicinity of the center of gravity during the hovering flight and the transition. This advantageous position of the lift and thrust center can be achieved, according to the invention, by arranging the pivot of the front pair of engines before the nose of the wing. The engines may also be arranged such that the landing flaps for the airplane will be turned with the engines and in the same range of turning movement as the latter.

The aircraft constructed in accordance with the invention advantageously also includes an engine located in the tail portion of the airplane which is provided for the horizontal flight of the craft. In the preferred arrangement, this engine is arranged to drive a compressor during the hovering and transition flight at which the other two engines are active. The compressed air is directed into a cell which is connected through pressure lines with compressed air control nozzles arranged at various end points on the aircraft so that they may aid in producing both rolling and yawing as well as pitching moments when they are operated. Thus, a sufficient amount of compressed air will be available during the hovering flight for control purposes without impairing the output of the lifting engines.

Accordingly, it is an object of the invention to provide an improved aircraft construction with front and rear pivotal engines mounted on each side of the fuselage adjacent the forward and trailing edge of the wing and with means supporting the front engines for pivotal movement together and the rear engines for pivotal movement together.

A further object of the invention is to provide an aircraft having at least four engines primarily for lift which are arranged in pairs on each side of the fuselage one pair in front of and one pair behind the wing and which also includes a cruising engine arranged in the tail portion of the aircraft connected to drive a compressor during hovering flight which supplies a thrust of compressed air for controlling the aircraft during hovering.

A further object of the invention is to provide an aircraft having a simple pivotal mounting arrangement for pairs of thrust engines to permit their pivotal movement for shifting from hovering to horizontal flight.

A further object of the invention is to provide an aircraft which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is a side elevation view of an aircraft constructed in accordance with the invention;

FIG. 2 is a view similar to FIG. 1, indicating the lift engines in a vertical thrust position;

FIG. 3 is a partial horizontal sectional view of the fuselage showing the pivoting mechanism for the lift engines; and FIG. 4 is a schematic partial top plan view and partial sectional view of the aircraft indicated in FIG. 1.

Referring to the drawings, in particular, the invention embodied therein comprises an airplane generally designated 1 having a fuselage 2 with a forward set of engines 3 and 3a mounted on respective sides thereof and a trailing or rear set of engines 4 and 4a mounted on respective opposite sides of the fuselage behind the engines 3 and 3a. In addition to the four vertical lift engines, there is provided a rigidly mounted cruising engine 5 which is advantageously arranged in the tail of the airplane and provides thrust along the horizontal direction for cruising.

In accordance with the invention, the front pair of engines 3 and 3a are connected to a shaft 7 in a manner permitting their eccentric pivotal movement upon rotation of the shaft. The rear pair of engines 4 and 4a are similarly mounted on a shaft 8. The shafts 7 and 8 extend through the fuselage 2, as best indicated in FIG. 3. The shaft 7 is advantageously arranged directly in front of the nose of the wing 9 and the shaft 8 is arranged adjacent the pivotal fulcrum for the wing landing flaps 10. The engines 3 and 3a may be pivoted by rotation of the shaft 7 between a position at which they are substantially vertical, as indicated in FIG. 2, to a position in which they extend substantially horizontally and below the wing 9 as indicated in FIG. 1. In a similar manner, the engines 4 and 4a may be pivoted from the horizontal position indicated in FIG. 2 upon rotation of the shaft 8.

In order to effect rotation of the engine position control shafts 7 and 8, they are connected through respective crank members 23 and 23' to respective piston rod members 24 and 24' associated with fluid cylinders 11a and 11b. Fluid cylinders 11a and 11b of the pivot drive are advantageously arranged in the fuselage in opposite mirror-like arrangement. In some instances, it is preferable to use only one fluid cylinder in place of the two 11a and 11b. The single fluid cylinder would operate in the same manner on the respective piston rods 24 and 24'.

As shown in the drawings, the rear engine 5 is provided with an air inlet 15 which is arranged on the base of the rudder 6. The exhaust gases exit through the rear of the engine 5 and may be deflected by means of deflecting flaps 21 in a uniform manner during hovering flight around the sides of the airplane so that no thrust component is produced by the tail engine 5. A feature of the tail engine arrangement is that the tail engine 5 is arranged to compress air and deliver it to a compressed air cell or pressure supply tank 12 which supplies thrust producing air and pressure through pressure lines 18, 19, 20, and 22, 25 and 26 to control nozzles, or air thrust discharges 13, 14, 15, 17, 27 and 28, respectively, connected to these lines at various end points of the airplane. Suitable control (not shown) is provided for cutting the various control nozzles 13, 14, 16 and 17 into and out of operation in order to control the airplane during the changeover from vertical to horizontal flight and also during hovering of the aircraft.

While a specific embodiment of the invention has been shown and described in detail to illustrate the application of the inventive principles, it will be understood that the invention may be embodied otherwise without departing from such principles.

What is claimed is:

1. A VTOL airplane comprising a fuselage with a wing extending outwardly from each side thereof, first and second forward thrust engines pivotally mounted on respective sides of said fuselage adjacent the forward edge of said wings, third and fourth trailing engines pivotally mounted on respective sides of said fuselage adjacent the trailing edge of said wings, means mounting first and second forward engines and said third and fourth trailing engines, respectively, for combined pivotal movement together, and a thrust engine rigidly mounted on said aircraft for directing thrust gases in the longitudinal direction of the aircraft, said means mounting said first and second forward engines and third and fourth trailing engines, respectively, for combined movement together comprising a first shaft extending through said fuselage and connected to said respective first and second engines and a second shaft extending through said fuselage and connected to said respective third and fourth engines.

2. A VTOL aircraft according to claim 1, wherein said first and second engines are eccentrically mounted on said first shaft and said third and fourth engines are eccentrically mounted on said second shaft.

3. A VTOL aircraft according to claim 2, wherein said first and second shafts penetrate through said fuselage.

4. A VTOL aircraft according to claim 2, wherein said first and second shafts are so arranged with regard to the fuselage that the direction of the thrust forces produced by said forward and trailing engines are symmetrical to the rolling axis of the airplane and also symmetrical to the pitching axis of the airplane within a range of the center of gravity.

5. A VTOL aircraft according to claim 2, wherein said first and second shafts are connected to pivotal drive means for rotating said shaft.

6. A VTOL aircraft according to claim 5, wherein said pivotal drive means comprises first and second fluid motors connected respectively to said first and second shafts.

7. A VTOL aircraft according to claim 6, wherein said first and second fluid motors are connected to said shafts to turn said first and second shafts simultaneously by an equal amount but in opposite directions.

References Cited

UNITED STATES PATENTS

| 3,132,827 | 5/1964 | Roy et al. | 244—52 |
| 3,165,280 | 1/1965 | Shao-Tang-Lee | 244—56 X |
| 3,302,907 | 2/1967 | Wilde et al. | 244—55 |

FOREIGN PATENTS 506,664  6/1954  Belgium.

MILTON BUCHLER, Primary Examiner
JAMES E. PITTENGER, Assistant Examiner

U.S. Cl. X.R.

244—55